(12) United States Patent
Hama et al.

(10) Patent No.: US 7,071,130 B2
(45) Date of Patent: Jul. 4, 2006

(54) LAMINATED MATERIAL OF SEGREGATING MEMBRANE AND SEGREGATING MEMBRANE SUPPORTING MATERIAL, AND ITS METHOD OF MANUFACTURE

(75) Inventors: Yoshitsugu Hama, Naruto (JP); Hideo Naka, Okayama (JP); Yoshifumi Kusaka, Tokushima (JP); Akihiro Okubo, Itano-gun (JP)

(73) Assignees: Awa Paper Mfg. Co., Ltd., Tokushima (JP); Japan Exlan Company Limited, Osaka (JP)

( * ) Notice: Subject to any disclaimer, the term of this patent is extended or adjusted under 35 U.S.C. 154(b) by 282 days.

(21) Appl. No.: 10/623,162

(22) Filed: Jul. 21, 2003

(65) Prior Publication Data

US 2005/0176330 A1     Aug. 11, 2005

Related U.S. Application Data

(63) Continuation of application No. 09/665,073, filed on Sep. 19, 2000, now abandoned.

(30) Foreign Application Priority Data

Sep. 20, 1999  (JP) ................... 11-265812

(51) Int. Cl.
   *B32B 5/24*   (2006.01)
   *B32B 27/02*  (2006.01)
   *B01D 39/14*  (2006.01)
   *B01D 71/06*  (2006.01)
   *B29C 35/02*  (2006.01)

(52) U.S. Cl. ............. 442/411; 442/409; 442/414; 442/415; 442/76; 210/490; 210/505; 210/500.38; 210/500.41; 210/500.42; 210/500.43; 264/340; 264/341; 264/343

(58) Field of Classification Search ........... 210/490, 210/503, 505, 500.38, 500.41, 500.42, 500.43; 96/12; 442/76, 77
See application file for complete search history.

(56) References Cited

U.S. PATENT DOCUMENTS

| | | | |
|---|---|---|---|
| 4,961,974 A * | 10/1990 | Jones | ................. 442/417 |
| 5,318,650 A | 6/1994 | Kerawalle | |
| 5,470,485 A | 11/1995 | Morweiser et al. | |
| 5,951,798 A | 9/1999 | Schmidt et al. | |
| 6,132,868 A | 10/2000 | Dean et al. | |
| 6,258,203 B1 | 7/2001 | Rokman et al. | |
| 6,372,004 B1 | 4/2002 | Schultink et al. | |

* cited by examiner

*Primary Examiner*—Jenna-Leigh Befumo
(74) *Attorney, Agent, or Firm*—Wenderoth, Lind & Ponack, L.L.P.

(57) ABSTRACT

Segregating membrane supporting material is a three-dimensional assembly of fibers thermo-compressed into non-woven fabric, and the non-woven fabric fibers are joined together in sheet form. This segregating membrane supporting material is non-woven fabric, including at least 10 weight % polyacrylonitrile-based synthetic fibers, which is thermo-compressed to give an overall bulk density 40% to 75% of the density of the fibers which make up the non-woven fabric.

81 Claims, 1 Drawing Sheet

LAMINATED MATERIAL OF SEGREGATING MEMBRANE AND SEGREGATING MEMBRANE SUPPORTING MATERIAL, AND ITS METHOD OF MANUFACTURE

This application is a Continuation application of Ser. No. 09/665,073, filed Sep. 19, 2000, now abandoned.

BACKGROUND OF THE INVENTION

This invention relates to a laminated material in which a segregating membrane is laminated on a supporting material. More specifically, this invention relates to a laminated material of a segregating membrane and a segregating membrane supporting material which is made of non-woven fabric substrate material for supporting and reinforcing a segregating membrane, in the fabrication of segregating membranes such as ultra-filter membranes, precision filter membranes, and reverse osmosis membranes, and to the method of manufacture of that laminated material.

Typically, a segregating membrane, such as a reverse osmosis membrane, is formed by applying a membrane forming liquid, made by dissolving membrane polymer material in a solvent, to a segregating membrane supporting material. Traditionally, thermo-compressed non-woven fabric, made by wet or dry processing methods, is used as segregating membrane supporting material. These segregating membrane supporting materials are made from non-woven fabric; a three-dimensional collection of short fibers joined at fiber crossing points. Naps or fibers extending out from the surface exist for these non-woven fabric supporting materials. Fibers extending out from the supporting material surface are the cause of defects such as pin-holes in the segregating membrane formed on the surface of the supporting material. This is because fibers extending from the supporting material surface pierce through the thin membrane forming liquid when the liquid is applied onto the segregating membrane supporting material.

Fibers extending out from the surface of non-woven fabric segregating membrane supporting material can be suppressed by a processing step to thermo-compress the non-woven fabric surface. By increasing temperature and pressure during the thermo-compression processing step, fibers extending from the surface of the non-woven fabric can be effectively suppressed. This is because the surfaces of thermo-plastic synthetic fibers, which make up the non-woven fabric are compressed. However, as thermo-compression process temperature and pressure are increased, the surface of the segregating membrane supporting material becomes less porous and the density within the non-woven fabric increases. As a result, penetration of the applied membrane forming liquid into the segregating membrane supporting material is obstructed, the anchoring effect responsible for adhesion of the segregating membrane to the supporting material is degraded, and the problem of reduced adhering strength develops.

Penetration of membrane liquid into the non-woven fabric can be improved with thicker non-woven fabric fibers which widen gaps between fibers. However, the total fiber count for non-woven fabric using thicker fibers is lower, and consequently segregating membrane supporting material uniformity decreases and the problem of local vacancies in the membrane liquid results. The supporting material properties of segregating membrane adhesion strength and supporting material uniformity are in mutual opposition, and satisfying requirements for both characteristics is extremely difficult. However, both uniformity and segregating membrane adhesion strength are extremely important supporting material characteristics, and supporting material becomes unusable if either characteristic is bad.

To solve this problem of critical characteristics in mutual opposition, the present applicant has developed a multi-layer segregating membrane supporting material structure, which is a laminate of two non-woven fabric layers as described in previous Japanese Patent Publication No. 4-21526 issued on Apr. 10, 1992. This segregating membrane supporting material is a double-layer structure made up of a coarse exterior surface layer using thick fibers laminated with a fine backside layer using thin fibers.

A laminated segregating membrane supporting material of double-layer construction can achieve a level of segregating membrane adhesion strength within a practical range, and can reduce membrane defects. However, along with recent expansion of segregating membrane applications, membrane adhesion strength capable of withstanding reverse-pressure cleaning is now being required. More robust membrane adhesion strength has come to be demanded, and these demands cannot be satisfied with the physical anchoring effect of prior-art technology.

The present invention was developed to further satisfy requirements for these characteristics. Thus it is a primary object of the present invention to provide a laminated material of a segregating membrane and a segregating membrane supporting material wherein segregating membrane adhesion strength is increased, and in addition a~uniform segregating membrane can be formed.

The above and further objects and features of the invention will more fully be apparent from the following detailed description with accompanying drawings.

SUMMARY OF THE INVENTION

In the laminated material of a segregating membrane and a segregating membrane supporting material, and its method of manufacture of this invention, the segregating membrane supporting material is made by joining together non-woven fabric, which is a three-dimensional collection of fibers, in sheet shape via thermo-compression processing. An essential constituent of the thermo-compressed non-woven fabric is at least 10% by weight polyacrylonitrile-based synthetic fibers. The bulk density of the thermo-compressed segregating membrane supporting material is 40% to 75% of the densit of the fibers comprising the non-woven fabric.

From 10% to 100% of the total fibers comprising the non-woven fabric, which is thermo-compressed segregating membrane supporting material, are polyacrylonitrile-based synthetic fibers. Preferably 20% to 70% by weight, more preferably 30% to 60% by weight, and optimally 40% to 60% by weight of the non-woven fabric content is polyacrylonitrile-based synthetic fibers.

Fibers which make up the non-woven fabric supporting material are preferably polyacrylonitrile-based synthetic fibers and binder fibers. Un-extended polyester fibers are used as the binder fibers. Binder fiber content is preferably 20% to 90% by weight.

Polyacrylonitrile-based synthetic fibers used in a segregating membrane supporting material have a size of, for example, diameter of 3.5 to 49.6 μm, and preferably diameter of 6.1 to 27.2 μm. An average fiber length of 1 to 25 mm, and preferably 3 to 15 mm is used, and the permeability of the segregating membrane supporting material is within a 0.5 to 10 cm$^3$/cm$^2$/sec range.

Further, the overall thickness of the thermo-compression processed non-woven fabric sheet material fabricated for the segregating membrane supporting material of this invention is preferably 50 to 150 µm.

The laminated material of segregating membrane and segregating membrane supporting material described above has the characteristics that segregating membrane adhesion strength is, increased, and furthermore a uniform segregating membrane can be formed. The segregating membrane supporting material is manufactured by wet or dry processing a three-dimensional collection of fibers including polyacrylonitrile-based synthetic fibers to form non-woven fabric, and processing this non-woven fabric by thermo-compression. Polyacrylonitrile-based synthetic fibers included in the non-woven fabric dissolve in amide-based solvents such as dimethyl formamide and dimethyl methoxyacetamide, or in sulfoxide-based solvents such as dimethyl sulfoxide. Solutions such as these are similarly used in segregating membrane formation. In the present invention, the solvent for fibers, which make up the supporting material non-woven fabric, is the same solution as the solvent for forming the segregating membrane. As a result, the surfaces of non-woven fabric polyacrylonitrile-based synthetic fibers can contact this mutual solvent during formation of the segregating membrane on the supporting material. This mutual solvent interacts with the polyacrylonitrile-based synthetic fibers within the non-woven fabric to cause swelling or dissolution, thereby adhering to the fibers which make up the non-woven fabric. Consequently, adhesion strength between the segregating membrane and the supporting material improves dramatically.

Further, polyacrylonitrile-based synthetic fiber used in a segregating membrane supporting material of this invention has a higher surface free-energy and its surface is more easily wet than polyester fiber used to make up prior-art segregating membrane supporting material non-woven fabric. Therefore, segregating membrane solution applied to the supporting material penetrates to the interior of the non-woven fabric, and adhesion strength is improved by a more effective anchoring effect.

DETAILED DESCRIPTION OF THE INVENTION

Figure 1:
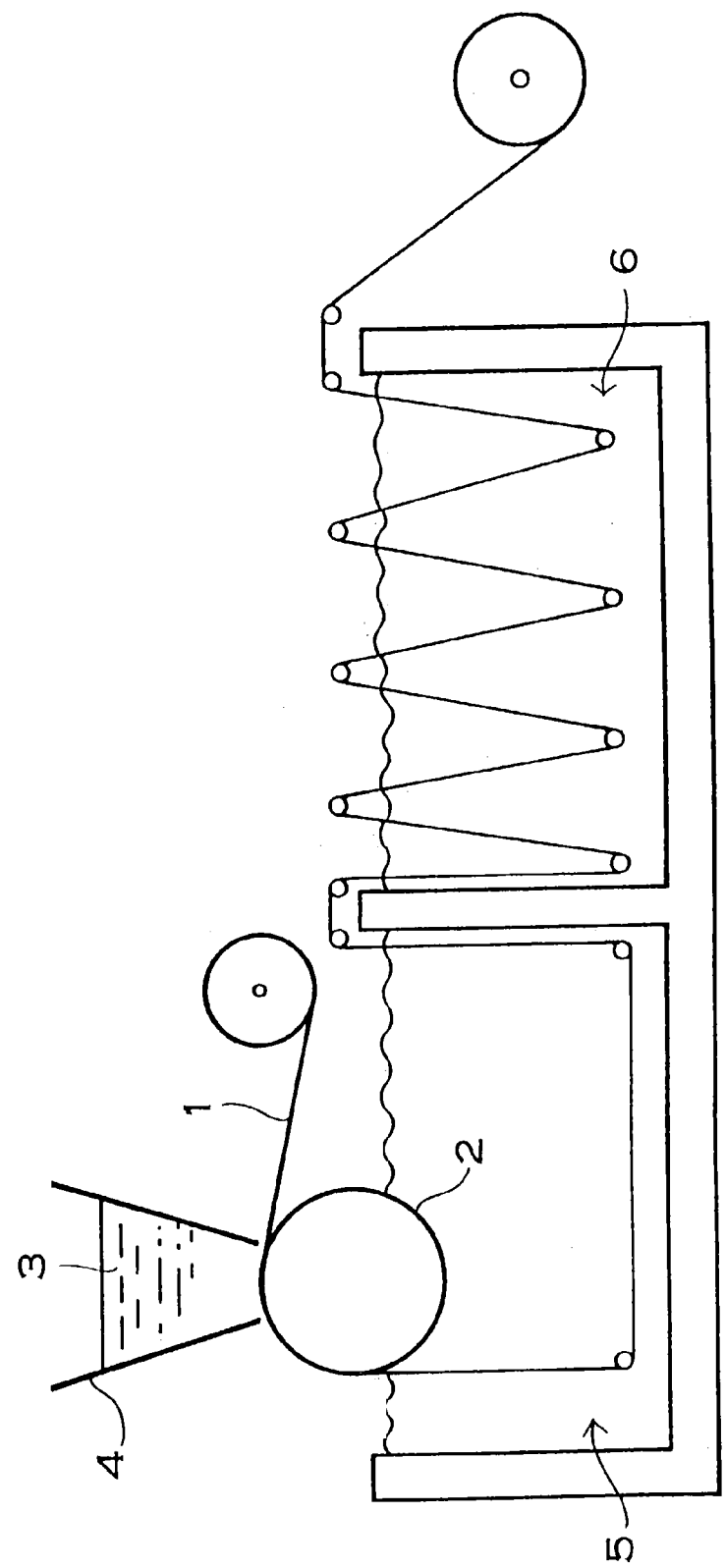
FIG. 1 is a cross-section view showing an embodiment of an apparatus to layer segregating membrane on supporting material.

Segregating membrane supporting material is manufactured by forming non-woven fabric via wet or dry processing a three-dimensional collection of fibers, and forming a sheet by joining together fibers comprising the non-woven fabric via thermo-compression processing.

Non-woven fabric is formed by various methods of manufacture such as dry processing and wet processing. Non-woven fabric is formed preferably by a mixture of primary fibers and binder fibers. The amount of binder fibers added is 0% to 90% by weight, preferably 10% to 80% by weight, and more preferably 15% to 80% by weight. Non-woven fabric can also be made without adding binder fibers. However, segregating membrane supporting material, made by thermo-compression processing of non-woven fabric with binder fibers added, has improved strength. This is because binder fibers weld together polyacrylonitrile-based synthetic fiber at crossing points during thermo-compression processing.

The amount of polyacrylonitrile-based synthetic fiber included in the non-woven fabric is, for example, 10% to 100% by weight, but in general is 10% to 90% by weight, preferably 20% to 70% by weight, more preferably 30% to 60% by weight, and optimally 40% to 60% by weight If the amount of polyacrylonitrile-based synthetic fiber included in the non-woven fabric is too small, the segregating membrane formed by attachment of membrane forming liquid will not sufficiently adhere to the supporting material. Conversely, if the amount of polyacrylonitrile-based synthetic fiber is too great, the amount of binder fiber will be reduced, fibers will not be joined together with sufficient strength, and the structural strength of the segregating membrane supporting material will be degraded. Consequently, segregating membrane adhesion strength and thermo-compressed supporting material structural strength are considered depending on the application to determine the optimum range, as cited above, of polyacrylonitrile-based synthetic fiber included in the non-woven fabric.

In addition to polyacrylonitrile-based synthetic fiber, the non-woven fabric may also include, alone or in combination as primary fibers or binder fibers, synthetic fiber such as polyester fiber, polyolefin fiber, nylon fiber, aramide fiber, polyphenylene sulfide fiber. Thermo-plastic synthetic fibers such as polyester fiber, polyolefin fiber, nylon fiber, aramide fiber, polyphenylene sulfide fiber can be used as binder fiber. Non-woven fabric which includes fibers like these can be made structurally strong due to fiber joining at crossing points with thermo-compression.

From the overall viewpoint of mechanical strength, chemical resistance, suitability for thermo-processing, and cost, segregating membrane supporting material non-woven fabric made of polyacrylonitrile-based synthetic fiber with polyester fiber added, is optimal. Polyester fiber additive to polyacrylonitrile-based synthetic fiber can use low melting point polyester fiber or un-extended polyester fiber as binder fiber.

Fibers that make up the non-woven fabric have a length, for example, 1 to 25 mm, and preferably 3 to 15 mm. Further, segregating membrane supporting material non-woven fabric, which is a collection of fibers thermo-compressed to a sheet form, has a weight per unit area of 50 to 120 $g/m^2$, an overall thickness of 50 to 150 µm, and a permeability of 0.5 to 10 $cm^3/cm^2/sec$.

Non-woven fabric is preferably fabricated by wet processing methods. This is because wet processing can produce non-woven fabric with overall uniformity. Needless to say, non-woven fabric made by dry processing or other methods may also be used as segregating membrane supporting material.

Thermo-compressed non-woven fabric segregating membrane supporting material has numerous minute vacancies between the fibers which make up the non-woven fabric. These vacancies cause the membrane forming liquid to penetrate moderately into the supporting material interior and improve membrane adhesion strength due to the anchoring effect. Ideal supporting material vacancy conditions not only improve segregating membrane adhesion strength due to the anchoring effect, but also eliminate membrane pinholes resulting from fibers extending out from membrane forming surface. To this end, segregating membrane supporting material fiber thickness, bulk density, and permeability values are restricted to specific ranges.

Segregating membrane supporting material is made up of non-woven fabric which includes at least 60% by weight fibers of size of, for example, diameter of 3.2 to 49.6 µm and preferably diameter of 5.5 to 27.2 µm.

Assuming segregating membrane supporting material weight per unit area and non-woven fabric fiber length constant, the number of fibers per unit area decreases as the ratio of oversized fibers increases. As a result, permeability increases and penetration of the membrane forming liquid into the supporting material improves, but large vacancies produce non-uniformity, uneven penetration, and local defects in the segregating membrane may occur.

To obtain uniform segregating membrane supporting material, the non-woven fabric includes at least 60% by weight fibers of size of diameter of 3.2 to 49.6 μm. If non-woven fabric fiber size is less than diameter of 3.2 μm vacancies become small, membrane forming liquid penetration becomes difficult, and segregating membrane adhesion strength decreases. Conversely, if non-woven fabric fiber size is greater than diameter of 49.6 μm, membrane forming liquid penetration improves, but uneven penetration occurs, local thinning or omission and membrane defects result.

Non-woven fabric, which is a three-dimensional collection of fibers, is thermo-compressed to produce segregating membrane supporting material with the targeted bulk density, permeability, surface conditions, and strength. Non-woven fabric, with additive thermo-plastic binder fiber, is formed into a sheet by thermo-compression processing, which joins together fibers at fiber crossing points. Pressure, temperature, and time during thermo-compression processing are varied to adjust segregating membrane supporting material bulk density, permeability, surface conditions, and strength to their optimum values. If segregating membrane supporting material non-woven fabric thermo-compression pressure and temperature are increased, and the length of time pressure is applied is increased, fibers are tightly assembled, bulk density increases, permeability decreases, the surface becomes smooth, and structural strength is improved. Conversely, if thermo-compression pressure and temperature are decreased, and the length of time pressure is applied is decreased, fibers are loosely assembled, bulk density decreases, permeability increases, the surface becomes rough, and structural strength is degraded.

Non-woven fabric is transported and sandwiched between two rollers for continuous thermo-compression and segregating membrane supporting material production. One or both of the rollers is a heating roller. Roller temperature, compression, and non-woven fabric transport speed, namely pressure application time, are adjusted to control the degree of thermo-compression. For example, heating roller surface temperatures of 200° to 250° C. melt those fibers of the non-woven fabric which are thermo-plastic, and join fibers together. Non-woven fabric thermo-compression processing time is set by fabric transport speed and roller diameter. If transport speed is slow and heating roller diameter is large, non-woven fabric thermo-compression time will be long. Non-woven fabric thermo-compression roller parameters are set, for example, to a roller diameter of 100 cm and a fabric transport speed of 20 to 100 m/min.

Post-thermo-compression non-woven fabric segregating membrane supporting material bulk density is 40% to 75%, and preferably 50% to 70% of the density of fibers comprising the non-woven fabric. If the bulk density of the thermo-compressed non-woven fabric supporting material is below 40% of the fiber density, fiber joining is insufficient, and use of the segregating membrane supporting material is not practical due to structural weakness of the material itself. However, if the non-woven fabric is thermo-compressed to the degree that bulk density is more than 75% of the fiber density, a sufficiently strong segregating membrane supporting material is obtained, a very dense structure is produced, but membrane forming liquid penetration into vacancies is difficult, and because vacancy volume is small, adhesion strength due to the anchoring effect is not achieved.

EMBODIMENTS

Embodiment 1

The laminated material of a segregating membrane and a segregating membrane supporting material of the present invention is fabricated by the following method.

(1) Non-woven Fabric Forming Step

Non-woven fabric is made by wet processing methods 40% by weight polyacrylonitrile-based synthetic fiber, and 60% by weight polyester fiber are used to form the non-woven fabric. Average length of the polyacrylonitrile-based synthetic fiber is 5 mm. Polyester fibers are mixed as 20% by weight primary fiber and 40% by weight binder fiber. Un-extended polyester fiber is used as binder fiber. Primary fiber is a mixture of the same weight of diameter of 12.4 μm fibers and diameter of 17.5 μm fibers. Binder fiber size is diameter of 10.1 μm. The density of polyester fibers is 1.39 g/cm$^3$, and the density of polyacrylonitrile-based synthetic fibers is 1.15 g/cm$^3$.

In the wet processing of the non-woven fabric, paper producing machines already in use for wet processing non-woven fabric, such as the Fourdrinier machine and inclined screen apparatus, are used. From the aspect of good fiber distribution and easy adjustment of directional orientation, apparatus using the inclined screen are optimal. The fibers and apparatus described above are used to produce non-woven fabric with a weight per unit area of 76.1 g/m$^2$.

(2) Non-woven Fabric Thermo-Compression Processing Step

Non-woven fabric fabricated via paper producing machines is adjusted to the previously cited bulk density and permeability target ranges by thermo-compression. Thermo-compression processing can be performed on a line separate from that of paper production, or it can be performed consecutively on the same line. Typically, continuous thermo-compression processing is performed by passing the non-woven fabric between a heated metal heating roller and a compression roller with some degree of flexibility.

Segregating membrane supporting material is obtained from the processing described above with a thickness of 118 μm, bulk density of 0.645 g/cm$^3$, vertical tensile strength (MD) of 7.11 kg/15 mm, horizontal tensile strength (CD) of 3.45 kg/15 mm, bursting strength of 3.8 kg/cm$^2$, permeability of 6.50 cm$^3$/cm$^2$/sec, and overall bulk density equal to 50% of the density of the fibers comprising the non-woven fabric.

The following describes segregating membrane formation on the surface of the segregating membrane supporting material produced as described above. Segregating membrane delamination strength is also measured. A segregating membrane is laminated on supporting material via the apparatus shown in FIG. 1. In this apparatus, membrane forming cast liquid 3 is attached as a film to the upper surface of the segregating membrane supporting material as it rotates around a drum 2. A hopper 4 disposed above the drum 2 is filled with cast liquid 3. The bottom of the hopper 4 is put in close proximity with the surface of the segregating membrane supporting material 1 to prevent cast liquid 3 from leaking out the interface between the supporting material 1 and the hopper 4.

To solidify the cast liquid 3 on the segregating membrane supporting material 1, the segregating membrane supporting material 1 follows the drum 2 into a gelatinizing bath 5. The segregating membrane supporting material 1 separates from the drum 2 and is immersed in the gelatinizing bath 5.

16.5% by weight polysulfone concentration dissolved in dimethyl formamide (DMF) is used as the membrane forming cast liquid 3. Since polysulfone has the property that it hardens into a gel when it contacts water, this cast liquid 3 gelatinizes when it is immersed in the gelatinizing bath 5 filled with water. In the apparatus of FIG. 1, water temperature in the gelatinizing bath 5 is 3° to 4° C., and cast liquid 3 applied to the segregating membrane supporting material 1 is made to slowly gel. Subsequently, the segregating membrane supporting material 1 passes from the gelatinizing bath 5 into an immersion bath 6 filled with water at room temperature. Immersion in the room temperature water bath 6 causes gelling while cleaning off residual DMF. In this manner, a polysulfone segregating membrane approximately 70 μm thick is produced on the surface of the segregating membrane supporting material 1.

As shown in Table 1, the delamination strength of the segregating membrane formed on the supporting material by the process described above is extremely strong at 680 g/50 mm. Further, no fibers extend from the surface of this segregating membrane supporting material, no islands are formed in the applied membrane forming liquid, the segregating membrane is thin overall, and reverse pressure cleaning can be effectively performed. The segregating membrane supporting material of this embodiment has excellent properties.

Embodiment 2

Fibers comprising the non-woven fabric are 10% by weight polyacrylonitrile-based synthetic fiber, 90% by weight polyester fiber, polyester fibers are 50% by weight primary fiber and 40% by weight binder fiber. Other than this fiber content, segregating membrane supporting material is produced in the same manner as embodiment 1, and its properties are listed in Table 1. The same polyacrylonitrile-based synthetic fibers and polyester fibers as used in embodiment 1 are used here.

This segregating membrane supporting material has a thickness of 103 μm, bulk density of 0.730 g/cm$^3$, vertical tensile strength (MD) of 6.98 kg/15 mm, horizontal tensile strength (CD) of 4.15 kg/15 mm, bursting strength of 4.8 kg/cm$^2$, permeability of 6.32 cm$^3$/cm$^2$/sec, and overall bulk density equal to 53% of the density of the fibers comprising the non-woven fabric.

When a segregating membrane is formed as a laminate on the segregating membrane supporting material in the same manner as embodiment 1, its delamination strength is extremely strong at 480 g/50 mm. Further, no fibers extend from the surface of this segregating membrane supporting material, no islands are formed in the applied membrane forming liquid, the segregating membrane is thin overall, and reverse pressure cleaning can be effectively performed. The segregating membrane supporting material of this embodiment has excellent properties.

Embodiment 3

Fibers comprising the non-woven fabric are 80% by weight polyacrylonitrile-based synthetic fiber, 20% by weight polyester fiber, and all polyester fibers are binder fibers. Other than, this fiber content, segregating membrane supporting material is produced in the same manner as embodiment 1, and its properties are listed in Table 1. The same polyacrylonitrile-based synthetic fibers and polyester fibers as used in embodiment 1 are used here.

TABLE 1

Comparison results for polyester and polyacrylonitrile-based synthetic fibers

| | | Comparison Example | Embodiment 1 | Embodiment 2 | Embodiment 3 |
|---|---|---|---|---|---|
| % Composition | Polyester binder fiber | 40 | 40 | 40 | 20 |
| | Polyester fiber | 60 | 20 | 50 | |
| | Polyacrylonitrile-based synthetic fiber | | 40 | 10 | 80 |
| SegreGating membrane supportIng Material properties | Weight per unit area [g/m$^2$] | 71.4 | 76.1 | 75.2 | 73.5 |
| | Thickness [mm] | 0.099 | 0.118 | 0.103 | 0.120 |
| | Bulk density [g/cm$^3$] | 0.721 | 0.645 | 0.730 | 0.613 |
| | Tensile strength (kg/15 mm) MD | 6.82 | 7.11 | 6.98 | 6.55 |
| | Tensile strength CD | 5.70 | 3.45 | 4.15 | 3.56 |
| | Bursting strength [kg/cm$^2$] | 5.4 | 3.8 | 4.8 | 3.4 |
| | Permeability [cm$^3$/cm$^2$/sec] | 5.67 | 6.5 | 6.32 | 6.56 |
| | Bulk density to fiber density [%] | 52 | 50 | 53 | 51 |
| Delamination strength [g/50 mm] | | 320 | 680 | 480 | no delam. |
| Compared to PET (as 100%) [%] | | 100 | 213 | 150 | ∞ |

This segregating membrane supporting material has a thickness of 120 μm, bulk density of 0.613 g/cm$^3$, vertical tensile strength (MD) of 6.55 kg/15 mm, horizontal tensile strength (CD) of 3.56 kg/15 mm, bursting strength of 3.4 kg/cm$^2$, permeability of 6.56 cm$^3$/cm$^2$/sec, and overall bulk density equal to 51% of the density of the fibers comprising the non-woven fabric.

When a segregating membrane is formed as a laminate on the segregating membrane supporting material in the same manner as embodiment 1, its adhesion is so strong it rips apart before delaminating. Further, no fibers extend from the surface of this segregating membrane supporting material, no islands are formed in the applied membrane forming liquid, the segregating membrane is thin overall, and reverse pressure cleaning can be effectively performed. The segregating membrane supporting material of this embodiment has excellent properties.

Comparison Example

Fibers comprising the non-woven fabric are entirely polyester fibers and they are 60% by weight primary fiber and 40% by weight binder fiber. Other than this fiber content, segregating membrane supporting material is produced in the same manner as embodiment 1, and its properties are listed in Table 1. The same polyester fibers as used in embodiment 1 are used here.

This segregating membrane supporting material has a thickness of 99 μm, bulk density of 0.721 g/cm$^3$, vertical tensile strength (MD) of 6.82 kg/15 mm, horizontal tensile strength (CD) of 5.70 kg/15 mm, bursting strength of 5.4 kg/cm$^2$, permeability of 5.67 cm$^3$/cm$^2$/sec, and overall bulk density equal to 52% of the density of the fibers comprising the non-woven fabric.

In spite of the fact the prototyped comparison example segregating membrane supporting material had an overall bulk density equal to 52% of the density of the fibers comprising the non-woven fabric, delamination strength was only 320 g/50 mm. This is extremely weak compared with the delamination strength of embodiments 1 through 3.

In the laminated material described above, polysulfone-based high polymer materials is used for a segregating membrane. However, one of polyvinylidene fluoride-based, polyamide-based, polyimide-based, or polyacrylonitrile-based high polymer materials may be used for the segregating membrane. The segregating membrane made of a choice of the polyvinylidene fluoride-based, polyamide-based, polyimide-based, or polyacrylonitrile-based high polymer materials is formed in amide-based solvents such as dimethyl formamide and dimethyl methoxyacetamide, or in sulfoxide-based solvents such as dimethyl sulfoxide. Solutions such as these are the same solution as the solvent for polyacrylonitrile-based synthetic fibers which make up the segregating membrane supporting material non-woven fabric. For this reason, when the segregating membrane made of a high polymer material such as these is formed on the segregating membrane supporting material, the mutual solvent interacts with the polyacrylonitrile-based synthetic fibers included in the non-woven fabric to cause swelling or dissolution, thereby adhering to the fibers which make up the non-woven fabric. Consequently, adhesion strength between the segregating membrane and the supporting material improves dramatically like a segregating membrane using polysulfone.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A membrane casted material made of a segregating membrane and a segregating membrane supporting material in which the segregating membrane is casted on the segregating membrane supporting material, the membrane casted material comprising:
   a segregating membrane including at least one member selected from the group consisting of polysulfone-based, polyvinylidene fluoride-based, polyamide-based, polyimide-based, and polyacrylonitrile-based high polymer materials, and
   a segregating membrane supporting material in which fibers are assembled in three-dimensions to form non-woven fabric, the non-woven fabric is processed by thermo-compression to join together fibers, which make up the non-woven fabric in sheet form, making the segregating membrane supporting material, and the non-woven fabric includes at least 10 weight % polyacrylonitrile-based synthetic fibers having a fiber length of 1 mm–25mm and is processed by thermo-compression making a segregating membrane supporting material with overall bulk density 40% to 75% of the density of the fibers which make up the non-woven fabric, and
   wherein the segregating membrane is dissolved in a solvent during casting which also dissolves the support material to bind the segregating membrane and segregating membrane supporting material.

2. A membrane casted material as recited in claim 1 wherein the segregating membrane supporting material is made from non-woven fabric, including 10 weight % to 100 weight % polyacrylonitrile-based synthetic fibers, which is thermo-compressed.

3. A membrane casted material as recited in claim 1 wherein the segregating membrane supporting material is made from non-woven fabric, including 20 weight % to 70 weight % polyacrylonitrile-based synthetic fibers, which is thermo-compressed.

4. A membrane casted material as recited in claim 1 wherein the segregating membrane supporting material is made from non-woven fabric, including 30 weight % to 60 weight % polyacrylonitrile-based synthetic fibers, which is thermo-compressed.

5. A membrane casted material as recited in claim 1 wherein the segregating membrane supporting material is made from non-woven fabric, including 40 weight % to 60 weight % polyacrylonitrile-based synthetic fibers, which is thermo-compressed.

6. A membrane casted material as recited in claim 1 wherein size of polyacrylonitrile-based synthetic fiber included in non-woven fabric of the segregating membrane supporting material is diameter of 3.5 to 49.6 μm.

7. A membrane casted material as recited in claim 1 wherein permeability of the segregating membrane supporting material is 0.5 cm$^3$/cm$^2$/sec to 10 cm$^3$/cm$^2$/sec.

8. A membrane casted material as recited in claim 1 wherein non-woven fabric of the segregating membrane supporting material includes polyacrylonitrile-based synthetic fibers and binder fibers.

9. A membrane casted material as recited in claim 8 wherein the binder fibers of the segregating membrane supporting material include a membrane selected from the group consisting of polyester fibers, polyolefin fibers, nylon fibers, aramide fibers, and polyphenylene sulfide fibers.

10. A membrane casted material as recited in claim 8 wherein the binder fibers of the segregating membrane supporting material are low melting point polyester fibers.

11. A membrane casted material as recited in claim 8 wherein the binder fibers of the segregating membrane supporting material are unextended polyester fibers.

12. A membrane casted material as recited in claim 8 wherein the non-woven fabric of the segregating membrane supporting material includes 20 weight % to 90 weight % binder fibers.

13. A membrane casted material as recited in claim 1 wherein thickness of the segregating membrane supporting material made from thermo-compressed non-woven fabric is 50 µm to 150 µm.

14. A method of manufacturing a membrane casted material in which a segregating membrane is casted on a segregating membrane supporting material,
wherein fibers are assembled in three-dimensions to form non-woven fabric, and non-woven fabric is processed by thermo-compression to join together fibers, which make up the non-woven fabric in sheet form, making the segregating membrane supporting material,
the method comprising:
processing by thermo-compression of the non-woven fabric including at least 10 weight % polyacrylonitrile-based synthetic fibers having a fiber length of 1 mm–25 mm to make a segregating membrane supporting material with overall bulk density 40% to 75% of the density of the fibers which make up the non-woven fabric, and
casting the segregating membrane on the segregating membrane supporting material,
wherein the segregating membrane includes at least one member selected from the group consisting of polysulfone based, polyvinylidene fluoride-based, polyamide-based, polyimide-based, and polyacrylonitrile-based high polymer materials, and
wherein the segregating membrane is dissolved in a solvent during casting which also dissolves the support material to bind the segregating membrane and segregating membrane support material.

15. A method of manufacturing a membrane casting material as recited in claim 14 wherein the segregating membrane supporting material is made from non-woven fabric, including 10 weight % to 100 weight % polyacrylonitrile-based synthetic fibers, which is thermo-compressed.

16. A method of manufacturing a membrane casting material as recited in claim 14 wherein the segregating membrane supporting material is made from non-woven fabric, including 20 weight % to 70 weight % polyacrylonitrile-based synthetic fibers, which is thermo-compressed.

17. A method of manufacturing a membrane casting material as recited in claim 14 wherein the segregating membrane supporting material is made from non-woven fabric, including 30 weight % to 60 weight % polyacrylonitrile-based synthetic fibers, which is thermo-compressed.

18. A method of manufacturing a membrane casting material as recited in claim 14 wherein the segregating membrane supporting material is made from non-woven fabric, including 40 weight % to 60 weight % polyacrylonitrile-based synthetic fibers, which is thermo- compressed.

19. A method of manufacturing a membrane casting material as recited in claim 14 wherein the segregating membrane supporting material is formed by using polyacrylonitrile-based synthetic fibers of size of diameter of 3.5 to 49.6 µm.

20. A method of manufacturing a membrane casting material as recited in claim 14 wherein the segregating membrane supporting material is made from non-woven fabric which is thermo-compressed to give a permeability of 0.5 cm$^3$/cm$^2$/sec to 10 cm$^3$/cm$^2$/sec.

21. A method of manufacturing a membrane casting material as recited in claim 14 wherein the segregating membrane supporting material is made by using non-woven fabric including polyacrylonitrile-based synthetic fibers and binder fibers.

22. A method of manufacturing a membrane casting material as recited in claim 21 wherein the segregating membrane supporting material is made by using one member selected from the group consisting of polyester fibers, polyolefin fibers, nylon fibers, aramide fibers, and polyphenylene sulfide fibers as binder fibers.

23. A method of manufacturing a membrane casting material as recited in claim 21 wherein the segregating membrane supporting material is made by using low melting point polyester fibers as binder fibers.

24. A method of manufacturing a membrane casting material as recited in claim 21 wherein the segregating membrane supporting material is made by using un-extended polyester fibers as binder fibers.

25. A method of manufacturing a membrane casting material as recited in claim 21 wherein the segregating membrane supporting material includes 20 weight % to 90 weight % binder fibers.

26. A method of manufacturing a membrane casting material as recited in claim 14 wherein thickness of the segregating membrane supporting material made from thermo-compressed non-woven fabric is 50 µm to 150 µm.

27. A method of manufacturing a membrane casting material as recited in claim 14 wherein the segregating membrane supporting material is made from non-woven fabric which is transported through and sandwiched between two rollers for thermo-compression processing.

28. A method of manufacturing a membrane casting material as recited in claim 27 wherein one of the two rollers for thermo-compression processing is a heating roller to make the segregating membrane supporting material.

29. A method of manufacturing a membrane casting material as recited in claim 27 wherein thermo-compression processing is by two heating rollers to make the segregating membrane supporting material.

30. A method of manufacturing a membrane casting material as recited in claim 27 wherein the segregating membrane supporting material is made from non-woven fabric which is thermo-compressed by heating roller with a surface temperature of 200° C. to 250° C.

31. A method of manufacturing a membrane casting material as recited in claim 27 wherein non-woven fabric is transported via heating roller at a speed of 20 m/min to 100 m/min.

32. A membrane casted material made of a segregating membrane and a segregating membrane supporting material in which the segregating membrane is casted on the segregating membrane supporting material, the membrane casted material comprising:
a segregating membrane including at least one member selected from the group consisting of polysulfone-based, polyvinylidene fluoride-based, polyamide-based, polyimide-based, and polyacrylonitrile-based high polymer materials, and
a segregating membrane supporting material in which fibers are assembled in three-dimensions to form non-woven fabric, the non-woven fabric is processed by thermo-compression to join together fibers, which make up the non-woven fabric in sheet form, making the segregating membrane supporting material, and the non-woven fabric includes at least 10 weight % polyacrylonitrile-based synthetic fibers and low melting point polyester binder fibers and is processed by thermo-compression making a segregating membrane supporting material with overall bulk density 40% to 75% of the density of the fibers which make up the non-woven fabric, and wherein the segregating membrane is dissolved in a solvent during casting which also dissolves the support material to bind the segregating membrane and segregating membrane supporting material.

33. A membrane casted material as recited in claim 32 wherein the segregating membrane supporting material is made from non-woven fabric, including 10 weight % to 100 weight % polyacrylonitrile-based synthetic fibers, which is thermo-compressed.

34. A membrane casted material as recited in claim 32 wherein the segregating membrane supporting material is made from non-woven fabric, including 20 weight % to 70 weight % polyacrylonitrile-based synthetic fibers, which is thermo-compressed.

35. A membrane casted material as recited in claim 32 wherein the segregating membrane supporting material is made from non-woven fabric, including 30 weight % to 60 weight % polyacrylonitrile-based synthetic fibers, which is thermo-compressed.

36. A membrane casted material as recited in claim 32 wherein the segregating membrane supporting material is made from non-woven fabric, including 40 weight % to 60 weight % polyacrylonitrile-based synthetic fibers, which is thermo-compressed.

37. A membrane casted material as recited in claim 32 wherein size of polyacrylonitrile-based synthetic fiber included in non-woven fabric of the segregating membrane supporting material is diameter of 3.5 to 49.6 μm.

38. A membrane casted material as recited in claim 32 wherein length of polyacrylonitrile-based synthetic fiber included in non-woven fabric of the segregating membrane supporting material is 1 mm to 25 mm.

39. A membrane casted material as recited in claim 32 wherein permeability of the segregating membrane supporting material is 0.5 cm$^3$/cm$^2$/sec to 10 cm$^3$/cm$^2$/sec.

40. A membrane casted material as recited in claim 32 wherein the segregating membrane supporting material includes 20 weight % to 90 weight % binder fibers.

41. A membrane casted material as recited in claim 32 wherein thickness of the segregating membrane supporting material made from thermo-compressed non-woven fabric is 50 μm to 150 μm.

42. A membrane casted material made of a segregating membrane and a segregating membrane supporting material in which the segregating membrane is casted on the segregating membrane supporting material, the membrane casted material comprising:

a segregating membrane including at least one member selected from the group consisting of polysulfone-based, polyvinylidene fluoride-based, polyamide-based, polyimide-based, and polyacrylonitrile-based high polymer materials, and a segregating membrane supporting material in which fibers are assembled in three-dimensions to form non-woven fabric, the non-woven fabric is processed by thermo-compression to join together fibers, which make up the non-woven fabric in sheet form, making the segregating membrane supporting material, and the non-woven fabric includes at least 10 weight % polyacrylonitrile-based synthetic fibers and un-extended polyester binder fibers and is processed by thermo-compression making a segregating membrane supporting material with overall bulk density 40% to 75% of the density of the fibers which make up the non-woven fabric, and wherein the segregating membrane is dissolved in a solvent during casting which also dissolves the support material to bind the segregating membrane and segregating membrane supporting material.

43. A membrane casted material as recited in claim 42 wherein the segregating membrane supporting material is made from non-woven fabric, including 10 weight % to 100 weight % polyacrylonitrile-based synthetic fibers, which is thermo-compressed.

44. A membrane casted material as recited in claim 42 wherein the segregating membrane supporting material is made from non-woven fabric, including 20 weight % to 70 weight % polyacrylonitrile-based synthetic fibers, which is thermo-compressed.

45. A membrane casted material as recited in claim 42 wherein the segregating membrane supporting material is made from non-woven fabric, including 30 weight % to 60 weight % polyacrylonitrile-based synthetic fibers, which is thermo-compressed.

46. A membrane casted material as recited in claim 42 wherein the segregating membrane supporting material is made from non-woven fabric, including 40 weight % to 60 weight % polyacrylonitrile-based synthetic fibers, which is thermo-compressed.

47. A membrane casted material as recited in claim 42 wherein size of polyacrylonitrile-based synthetic fiber of the segregating membrane supporting material is diameter of 3.5 to 49.6 μm.

48. A membrane casted material as recited in claim 42 wherein length of polyacrylonitrile-based synthetic fiber of the segregating membrane supporting material is 1 mm to 25 mm.

49. A membrane casted material as recited in claim 42 wherein permeability of the segregating membrane supporting material is 0.5 cm$^3$/cm$^2$/sec to 10 cm$^3$/cm$^2$/sec.

50. A membrane casted material as recited in claim 42 wherein the segregating membrane supporting material includes 20 weight % to 90 weight % binder fibers.

51. A membrane casted material as recited in claim 42 wherein thickness of the segregating membrane supporting material made from thermo-compressed non-woven fabric is 50 μm to 150 μm.

52. A method of manufacturing a membrane casting material in which a segregating membrane is casted on a segregating membrane supporting material, wherein fibers are assembled in three-dimensions to form non-woven fabric, and non-woven fabric is processed by thermo-compression to join together fibers, which make up the non-woven fabric in sheet form, making the segregating membrane supporting material, the method comprising:

processing by thermo-compression of the non-woven fabric including at least 10 weight % polyacrylonitrile-based synthetic fibers and low melting point polyester binder fibers to make a segregating membrane supporting material with overall bulk density 40% to 75% of the density of the fibers which make up the non-woven fabric, and casting the segregating membrane on the segregating membrane supporting material, wherein the segregating membrane includes at least one member selected from the group consisting of polysulfone based, polyvinylidene fluoride-based, polyamide-based, polyimide-based, and polyacrylonitrile-based high polymer materials, wherein the segregating membrane is dissolved in a solvent during casting which also dissolves the support material to bind the segregating membrane and segregating membrane support material.

53. A method of manufacturing a membrane casting material as recited in claim 52 wherein the segregating membrane supporting material is made from non-woven fabric, including 10 weight % to 100 weight % polyacrylonitrile-based synthetic fibers, which is thermo-compressed.

54. A method of manufacturing a membrane casting material as recited in claim 52 wherein the segregating membrane supporting material is made from non-woven fabric, including 20 weight % to 70 weight % polyacrylonitrile-based synthetic fibers, which is thermo-compressed.

55. A method of manufacturing a membrane casting material as recited in claim 52 wherein the segregating membrane supporting material is made from non-woven fabric, including 30 weight % to 60 weight % polyacrylonitrile-based synthetic fibers, which is thermo-compressed.

56. A method of manufacturing a membrane casting material as recited in claim 52 wherein the segregating membrane supporting material is made from non-woven fabric, including 40 weight % to 60 weight % polyacrylonitrile-based synthetic fibers, which is thermo-compressed.

57. A method of manufacturing a membrane casting material as recited in claim 52 wherein the segregating membrane supporting material is made by using polyacrylonitrile-based synthetic fibers having a fiber size of diameter of 3.5 to 49.6 μm.

58. A method of manufacturing a membrane casting material as recited in claim 52 wherein the segregating membrane supporting material is made by using polyacrylonitrile-based synthetic fibers having a fiber length of 1 mm to 25 mm.

59. A method of manufacturing a membrane casting material as recited in claim 52 wherein the segregating membrane supporting material is thermo-compressed to give a permeability of 0.5 $cm^3/cm^2/sec$ to 10 $cm^3/cm^2/sec$.

60. A method of manufacturing a membrane casting material as recited in claim 52 wherein the segregating membrane supporting material includes 20 weight % to 90 weight % binder fibers.

61. A method of manufacturing a membrane casting material as recited in claim 52 wherein thickness of the segregating membrane supporting material made from thermo-compressed non-woven fabric is 50 μm to 150 μm.

62. A method of manufacturing a membrane casting material as recited in claim 52 wherein the segregating membrane supporting material is made from non-woven fabric which is transported through and sandwiched between two rollers for thermo-compression processing.

63. A method of manufacturing a membrane casting material as recited in claim 62 wherein one of the two rollers for thermo-compression processing is a heating roller to make the segregating membrane supporting material.

64. A method of manufacturing a membrane casting material as recited in claim 62 wherein thermo-compression processing is by two heating rollers to make the segregating membrane supporting material.

65. A method of manufacturing a membrane casting material as recited in claim 62 wherein the segregating membrane supporting material is made from non-woven fabric which is thermo-compressed by heating roller with a surface temperature of 200° C. to 250° C.

66. A method of manufacturing a membrane casting material as recited in claim 62 wherein non-woven fabric is transported via heating roller at a speed of 20 m/min to 100 m/min.

67. A method of manufacturing a casting membrane material in which a segregating membrane is casted on a segregating membrane supporting material, wherein fibers are assembled in three-dimensions to form non-woven fabric, and non-woven fabric is processed by thermo-compression to join together fibers, which make up the non-woven fabric in sheet form, making the segregating membrane supporting material, the method comprising:

processing by thermo-compression of the non-woven fabric including at least 10 weight % polyacrylonitrile-based synthetic fibers and un-extended polyester binder fibers to make a segregating membrane supporting material with overall bulk density 40% to 75% of the density of the fibers which make up the non-woven fabric, and casting the segregating membrane on the segregating membrane supporting material, wherein the segregating membrane includes at least one member selected from the ground consisting of polysulfone based, polyvinylidene fluoride-based, polyamide-based, polyimide-based, and polyacrylonitrile-based high polymer materials, wherein the segregating membrane is dissolved in a solvent during casting which also dissolves the support material to bind the segregating membrane and segregating membrane support material.

68. A method of manufacturing a membrane casting material as recited in claim 67 wherein the segregating membrane supporting material is made from non-woven fabric, including 10 weight % to 100 weight % polyacrylonitrile-based synthetic fibers, which is thermo-compressed.

69. A method of manufacturing a membrane casting material as recited in claim 67 wherein the segregating membrane supporting material is made from non-woven fabric, including 20 weight % to 70 weight % polyacrylonitrile-based synthetic fibers, which is thermo-compressed.

70. A method of manufacturing a membrane casting material as recited in claim 67 wherein the segregating membrane supporting material is made from non-woven fabric, including 30 weight % to 60 weight % polyacrylonitrile-based synthetic fibers, which is thermo-compressed.

71. A method of manufacturing a membrane casting material as recited in claim 67 wherein the segregating membrane supporting material is made from non-woven fabric, including 40 weight % to 60 weight % polyacrylonitrile-based synthetic fibers, which is thermo-compressed.

72. A method of manufacturing a membrane casting material as recited in claim 67 wherein the segregating membrane supporting material is made by using polyacrylonitrile-based synthetic fibers having a fiber size of diameter of 3.5 to 49.6 μm.

73. A method of manufacturing a membrane casting material as recited in claim 67 wherein the segregating membrane supporting material is made by using polyacrylonitrile-based synthetic fibers having a fiber length of 1 mm to 25 mm.

74. A method of manufacturing a membrane casting material as recited in claim 67 wherein the segregating membrane supporting material is thermo-compressed to give a permeability of 0.5 cm³/cm²/sec to 10 cm³/cm²/sec.

75. A method of manufacturing a membrane casting material as recited in claim 67 wherein the segregating membrane supporting material includes 20 weight % to 90 weight % binder fibers.

76. A method of manufacturing a membrane casting material as recited in claim 67 wherein thickness of the segregating membrane supporting material made from thermo-compressed non-woven fabric is 50 μm to 150 μm.

77. A method of manufacturing a membrane casting material as recited in claim 67 wherein the segregating membrane supporting material is made form non-woven fabric which is transported through and sandwiched between two rollers for thermo-compression processing.

78. A method of manufacturing a membrane casting material as recited in claim 77 wherein one of the two rollers for thermo-compression processing is a heating roller to make the segregating membrane supporting material.

79. A method of manufacturing a membrane casting material as recited in claim 77 wherein thermo-compression processing is by two heating rollers to make the segregating membrane supporting material.

80. A method of manufacturing a membrane casting material as recited in claim 77 wherein the segregating membrane supporting material is made from non-woven fabric which is thermo-compressed by heating roller with a surface temperature of 200° C. to 250° C.

81. A method of manufacturing a membrane casting material as recited in claim 77 wherein non-woven fabric is transported via heating roller at a speed of 20 m/min to 100 m/min.

* * * * *